US011999057B2

(12) United States Patent
Norton et al.

(10) Patent No.: US 11,999,057 B2
(45) Date of Patent: Jun. 4, 2024

(54) CONTINUUM ARM ROBOT SYSTEM

(71) Applicant: ROLLS-ROYCE plc, London (GB)

(72) Inventors: Andrew D Norton, Derby (GB);
Dragos A Axinte, Nottingham (GB);
Matteo Russo, Nottingham (GB); Xin Dong, Nottingham (GB)

(73) Assignee: ROLLS-ROYCE plc, London (GB)

(*) Notice: Subject to any disclaimer, the term of this patent is extended or adjusted under 35 U.S.C. 154(b) by 0 days.

(21) Appl. No.: 17/882,816

(22) Filed: Aug. 8, 2022

(65) Prior Publication Data
US 2023/0052058 A1 Feb. 16, 2023

(30) Foreign Application Priority Data

Aug. 12, 2021 (GB) ...................................... 2111565

(51) Int. Cl.
*B25J 9/06* (2006.01)
*B25J 9/00* (2006.01)
*B25J 9/16* (2006.01)
*B25J 13/08* (2006.01)
*B25J 15/00* (2006.01)
*B25J 18/06* (2006.01)

(52) U.S. Cl.
CPC ............. *B25J 9/065* (2013.01); *B25J 9/0087* (2013.01); *B25J 9/1697* (2013.01); *B25J 13/088* (2013.01); *B25J 15/0028* (2013.01); *B25J 18/06* (2013.01)

(58) Field of Classification Search
CPC ................................ B25J 9/065; B25J 9/0087
See application file for complete search history.

(56) References Cited

U.S. PATENT DOCUMENTS

| 4,954,952 | A | 9/1990 | Ubhayakar et al. |
| 9,066,655 | B2 | 6/2015 | Stefanchik et al. |
| 2015/0081092 | A1* | 3/2015 | Jacobsen .................. B25J 5/007 901/1 |
| 2017/0071688 | A1* | 3/2017 | Cohen ..................... A61B 34/74 |
| 2018/0009109 | A1* | 1/2018 | Norton .................... B25J 9/1682 |

FOREIGN PATENT DOCUMENTS

| CN | 112720438 A | * | 4/2021 | ............. B25J 9/065 |
| CZ | 35 140 U1 | | 6/2021 | |
| CZ | 35140 | * | 6/2021 | ............... B23Q 3/00 |

(Continued)

OTHER PUBLICATIONS

Jan. 10, 2023 European Search Report Issued in European Patent Application No. 22188933.0.

(Continued)

*Primary Examiner* — Randell J Krug
(74) *Attorney, Agent, or Firm* — Oliff PLC

(57) ABSTRACT

A continuum arm robot system comprising at least a first continuum arm robot and a second continuum arm robot, each continuum arm robot being controlled by its own actuator pack, and each actuator pack being coupled to a single control computer, wherein at least the second continuum arm robot comprises a releasable connection mechanism to engage in gripping the first continuum arm robot in a workspace, so as to link the at least two continuum arm robots into a single redundant robotic system with at least the second continuum arm robot providing support for the first continuum arm robot.

15 Claims, 7 Drawing Sheets

(56) References Cited

FOREIGN PATENT DOCUMENTS

Figure 1B:
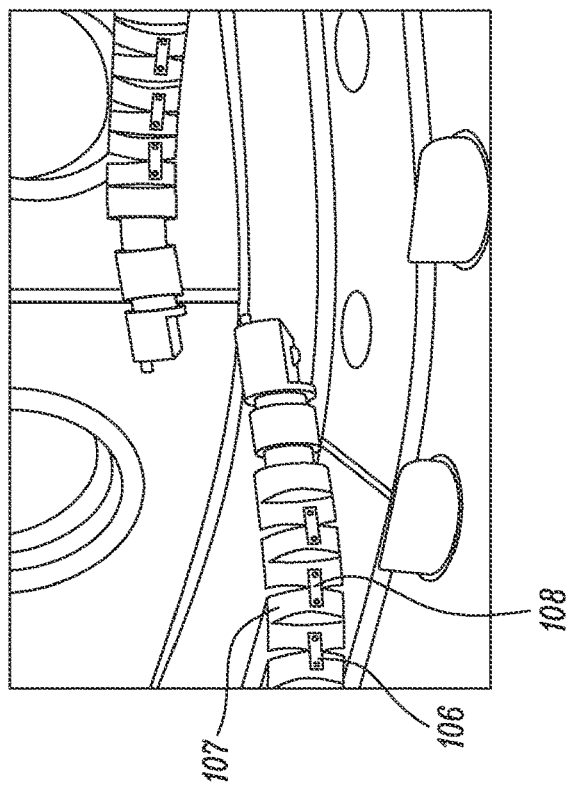

| WO | 2015/168177 | A1 | 11/2015 | | |
|---|---|---|---|---|---|
| WO | 2015/168177 | A8 | 5/2016 | | |
| WO | WO-2017006375 | A1 * | 1/2017 | ............... | A61B 1/04 |

OTHER PUBLICATIONS

May 27, 2022 Search Report issued in British Patent Application No. 2111565.4.
Walker, Ian D. et al., "Snake-Like and Continuum Robots", Springer Handbook of Robotics, pp. 481-498.
Festo, "Bionic Handling Assistant", https://www.festo.com/group/en/cms/10241.htm.
OC Robotics, X125 Snake Arm, http://www.ocrobotics.com/technology-/series-ii-x125-system/.
Dong, Xin et al., "Design and analysis of a family of snake arm robots connected by compliant joints", Mechanism and Machine Theory, 77, pp. 73-91, 2014.
Li, Zheng et al., "Design and Analysis of a Bio-Inspired Wire-Driven Multi-Section Flexible Robot", International Journal of Advanced Robotic Systems, vol. 10, No. 4, 209, 2013.
Butler, Evan et al., "Robotic Neuro-Endoscope with Concentric Tube Augmentation", Intelligent Robots and Systems (IROS), 2012 IEEE/RSJ International Conference, pp. 2941-2946, Oct. 2012.
Kim, Yong-Jae et al., "Design of a Tubular Snake-like Manipulator with Stiffening Capability by Layer Jamming", 2012 IEEE/RSJ International Conference on Intelligent Robots and Systems, pp. 4251-4256, Oct. 2012.
Shiva, Ali et al., "Tendon-Based Stiffening for a Pneumatically Actuated Soft Manipulator", IEEE Robotics and Automation Letters, vol. 1, No. 2, pp. 632-637, Jul. 2016.
Tanaka, Motoyasu et al., "Cooperative Control of Two Snake Robots", Proceedings of the 2006 IEEE International Conference on Robotics and Automation, pp. 400-405, Jan. 2006.
Lotfavar, Amir et al., "Cooperative Continuum Robots: Concept, Modeling, and Workspace Analysis", IEEE Robotics and Automation Letters, vol. 3, No. 1, pp. 426-433, Jan. 2018.

* cited by examiner

CONTINUUM ARM ROBOT SYSTEM

OVERVIEW OF THE DISCLOSURE

The disclosure relates to a system of linked continuum arm robots. In particular, the disclosure relates to multiple joined dual functional continuum arm robots.

BACKGROUND OF THE DISCLOSURE

Continuum arm or snake arm robots are of growing interest in a number of applications. This is because the robots can be manipulated into spaces in which other robotic systems or human operators cannot readily access. This is due to the ability to manipulate the body with a number of degrees of freedom so that the end tool can be positioned accurately and easily. This positioning is controlled by actuators which manipulate the tendons within the robot so that each joint of the arm can be individually controlled to within a high degree of positional accuracy.

Most arm robots have 6 degrees of freedom or less. However, if a task requires a greater amount of dexterity the number of degrees of freedom required is increased. In such cases the number of degrees of freedom needs to be increased. This increase in the number of degrees of freedom means that the arms are able to operate in confined areas, for example in maintenance of complex structures or for use in minimally invasive surgery. Continuum arm robots are designed along two main paths: Firstly, there are snake-like robots, which consist of multiple rigid-link sections that are connected by either a rigid R/U/S (Revolute/Universal/Spherical) joints or by a compliant joint. Each section is composed of one or more segments and controlled independently from the others with on-board or remote actuation. Secondly, there are continuum robots, which consist of a compliant backbone whose local and global deformation is controlled by one or more actuators.

Despite the functionality there are issues with the current designs of highly compliant robots, which result from the number of joints required in the robot arm. As a consequence of these joints the robot arm suffers from a low degree of stiffness when compared to conventional 6 degrees of freedom robots. This reduced stiffness results in a reduced load carrying capacity as well reducing the interaction that the arm can have with the environment within which it is operating. The current state of the art aims to overcome this by "freezing" the system through locking the actuator or by the addition of stiffening means to the backbone. This can work for shorter length robotic arms, however, when employed on longer length robots the arms act like long cantilever beams and the deflection of the beams causes significant position and navigation issues. This limits the use of such robots to lightweight tasks for risk of damaging the robot and/or the object that the robot is working on. Therefore, there is a requirement for an improved continuum arm robot system to overcome these issues.

SUMMARY OF THE DISCLOSURE

According to a first aspect of the disclosure there is provided a continuum arm robot system comprising at least a first continuum arm robot and a second continuum arm robot, each continuum arm robot being controlled by its own actuator pack, and each actuator pack being coupled to a single control computer, wherein at least the second continuum arm robot comprises a releasable connection mechanism to engage in gripping the first continuum arm robot in a workspace, so as to link the at least two continuum arm robots into a single redundant robotic system with at least the second continuum arm robot providing support for the first continuum arm robot.

The connection mechanism may be positioned at the end of the second continuum arm robot.

The connection mechanism may be positioned along the continuum arm section and the end of the continuum arm section features a functional head.

The connection mechanism may be one of hydraulic, pneumatic, a mechanical gripper or electromagnetic.

Each continuum arm robot may comprise a plurality of sensors. Some of the sensors may be provided to determine the distance and relative position between the first and second continuum arms.

The clamp may feature an interlock, which prevents movement of the robot system if the interlock is activated.

The second continuum arm robot may feature a functional tool at its tip.

One of the continuum arm robots may be equipped with a camera system and/or an illumination system.

The behaviour of connection mechanism may be rigid.

The connection mechanism may be compliant.

The connection may constrain the system to less than six degrees of freedom.

Both of the arms may be continuum arm robots.

One of the arms may be a compliant partially robotic arm.

According to a second aspect of the disclosure there is provided method of operating the robot system as described above, wherein the method comprises: inserting the first continuum arm robot and inserting the second continuum arm robot into a workspace; connecting the first and second continuum arm robot to link the robots to form a robotic system; performing the desired task using at least the first continuum arm robot; disconnecting the first and second continuum arm robots; and extracting the continuum arm robots from the workspace.

The first and second continuum robots may be moved onto predefined configurations and may be controlled through relative positioning and approach each other to connect the first and second arms.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

BRIEF DISCUSSION OF THE FIGURES

Figure 1A:
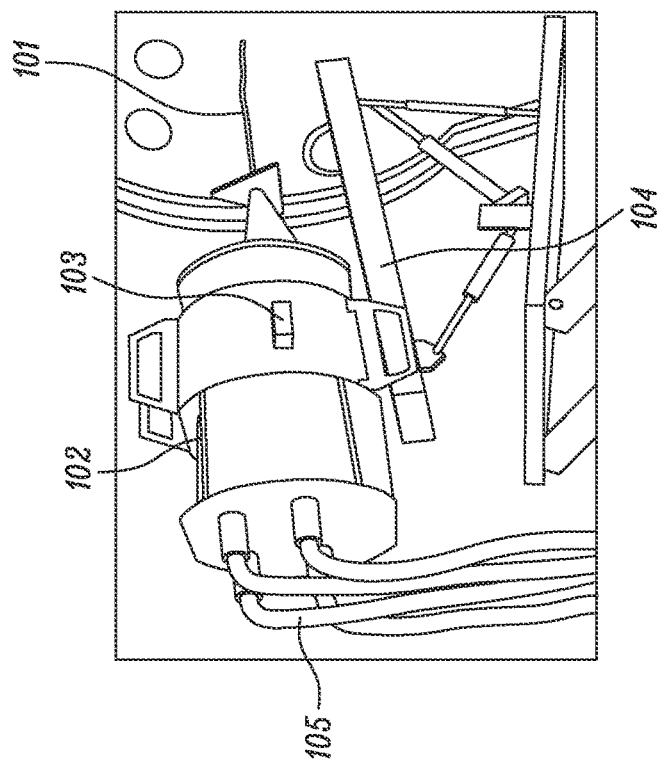
Figure 2:
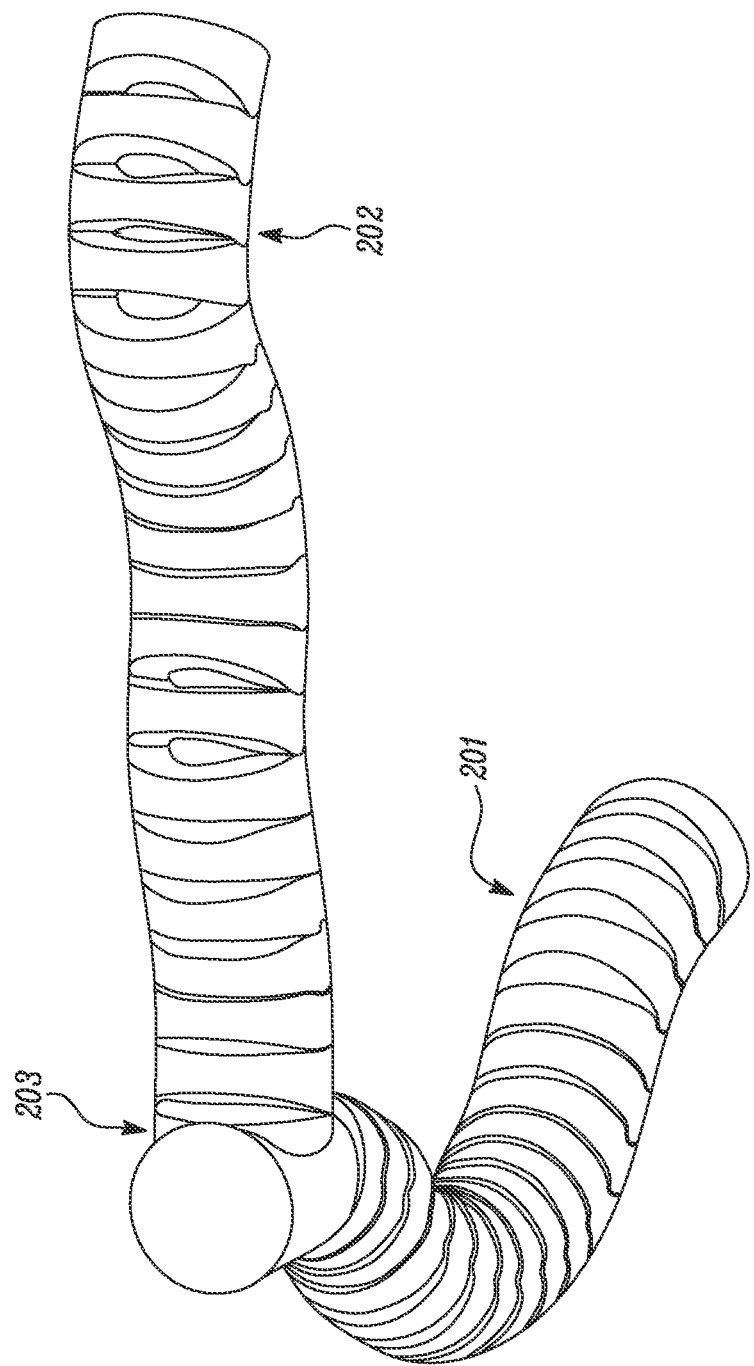
Figure 3:
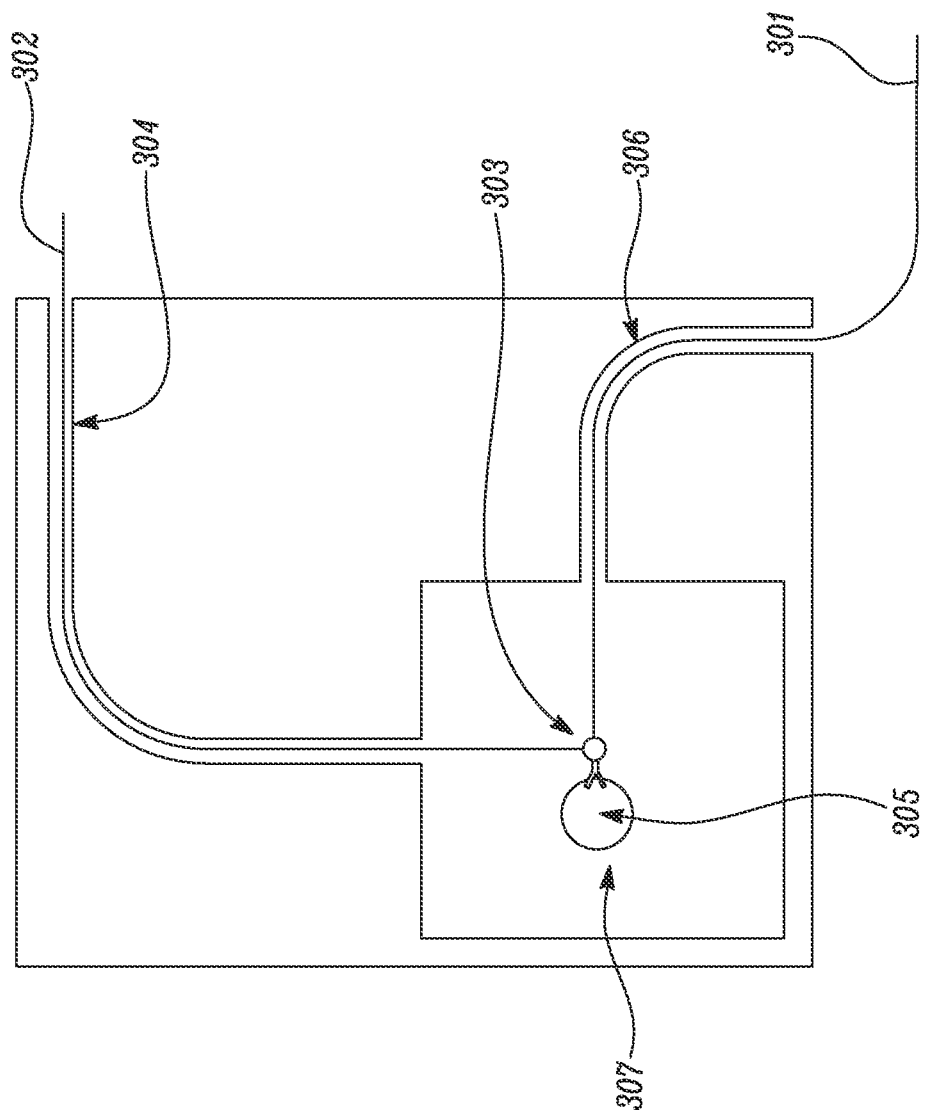
Figure 4:
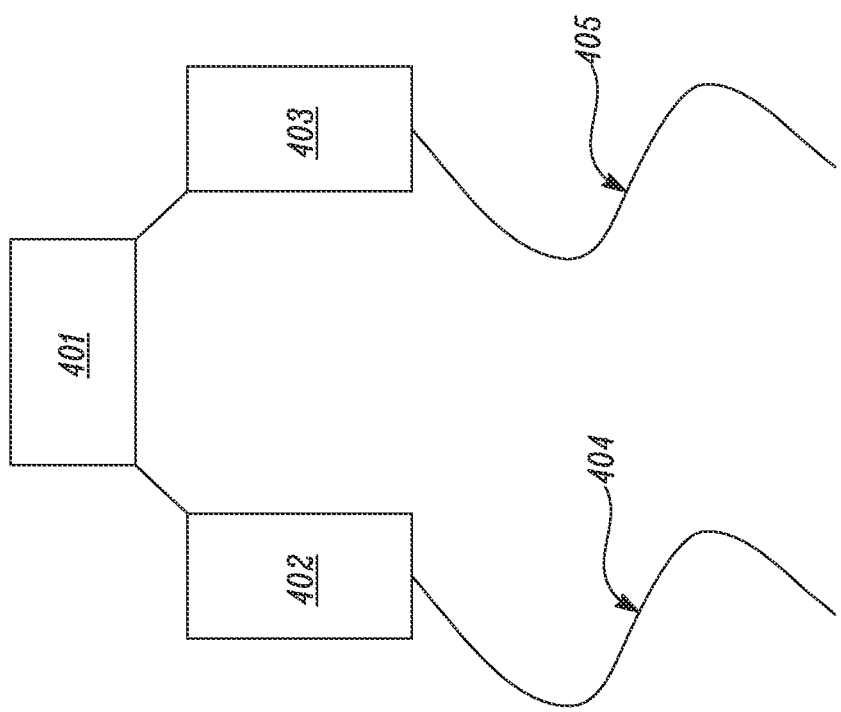
Figure 5:
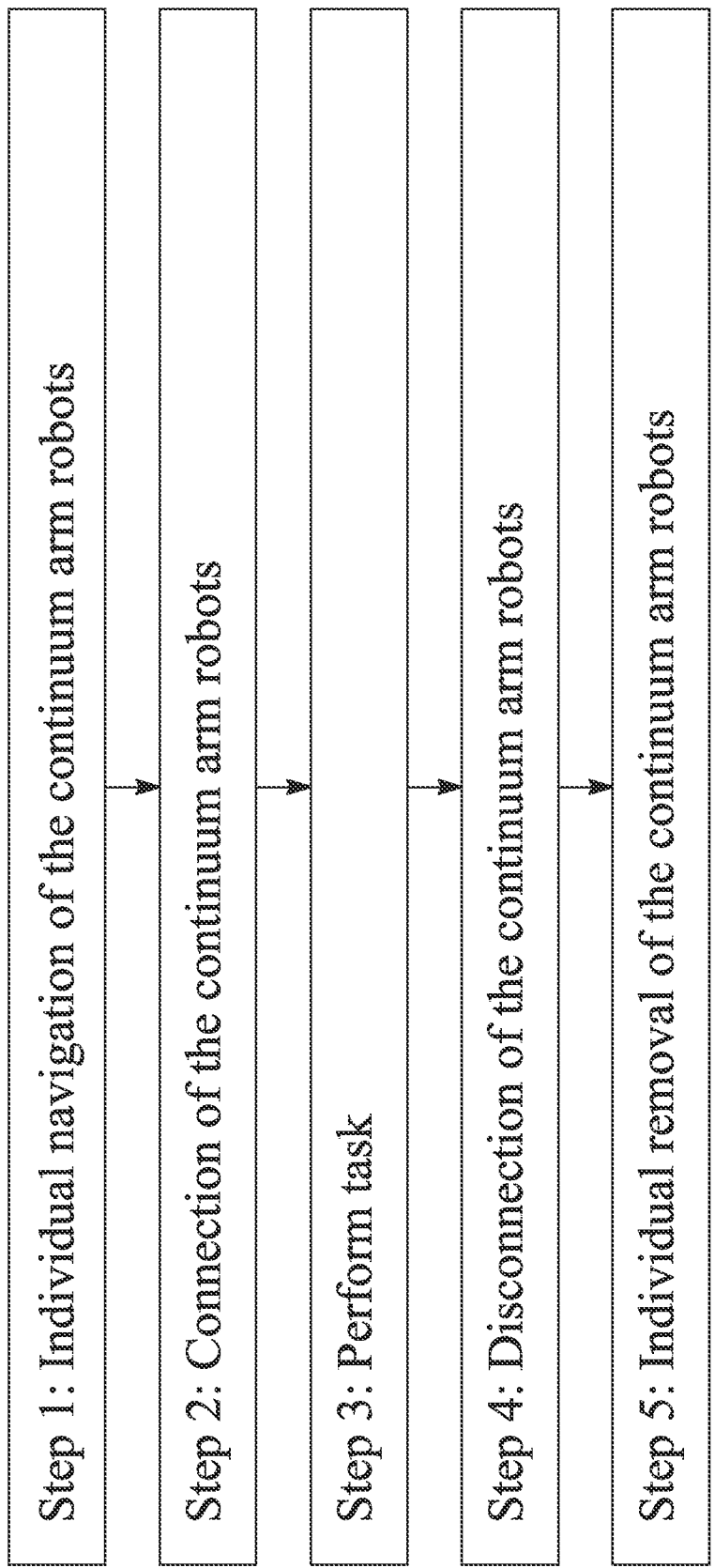
Figure 6:
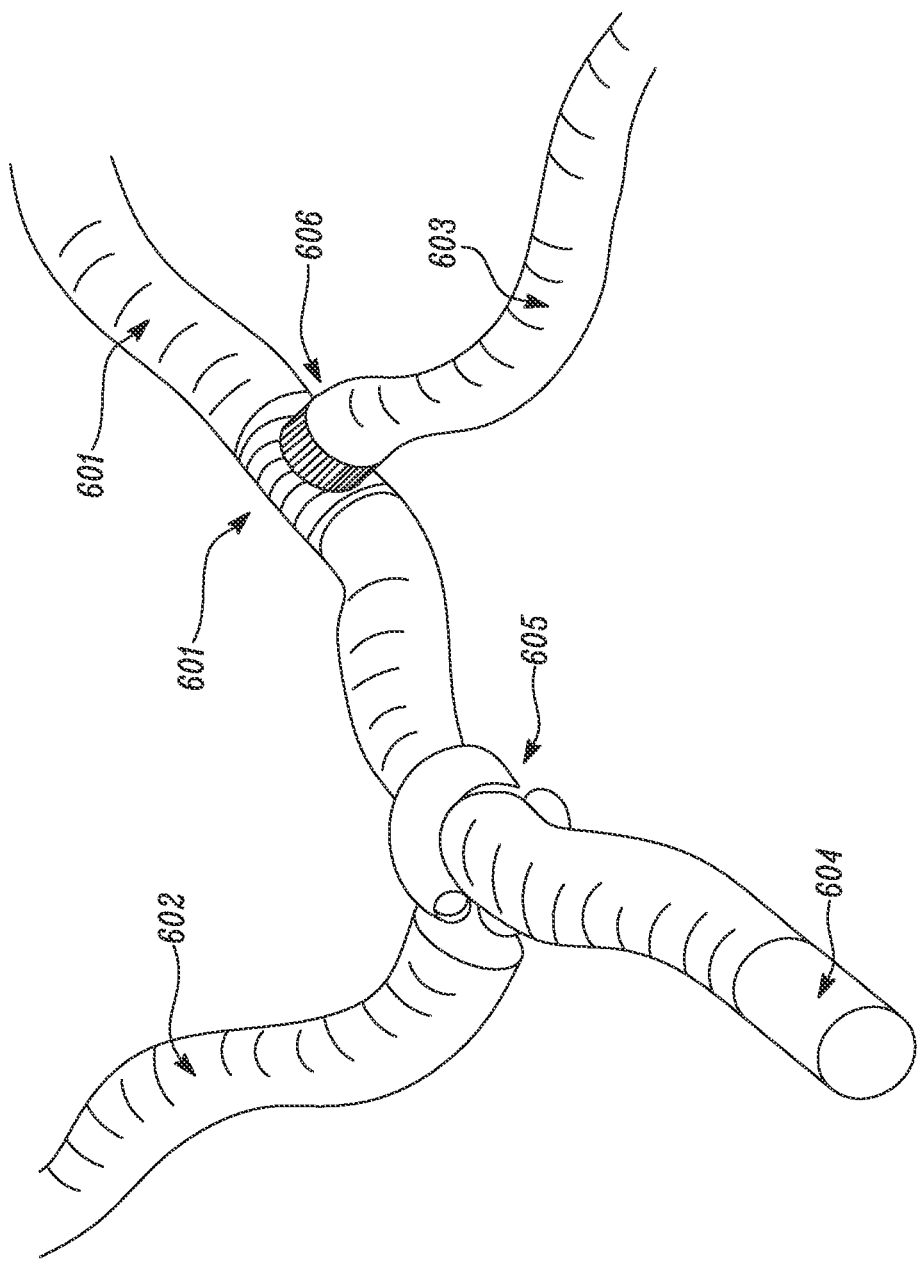
Figure 7:
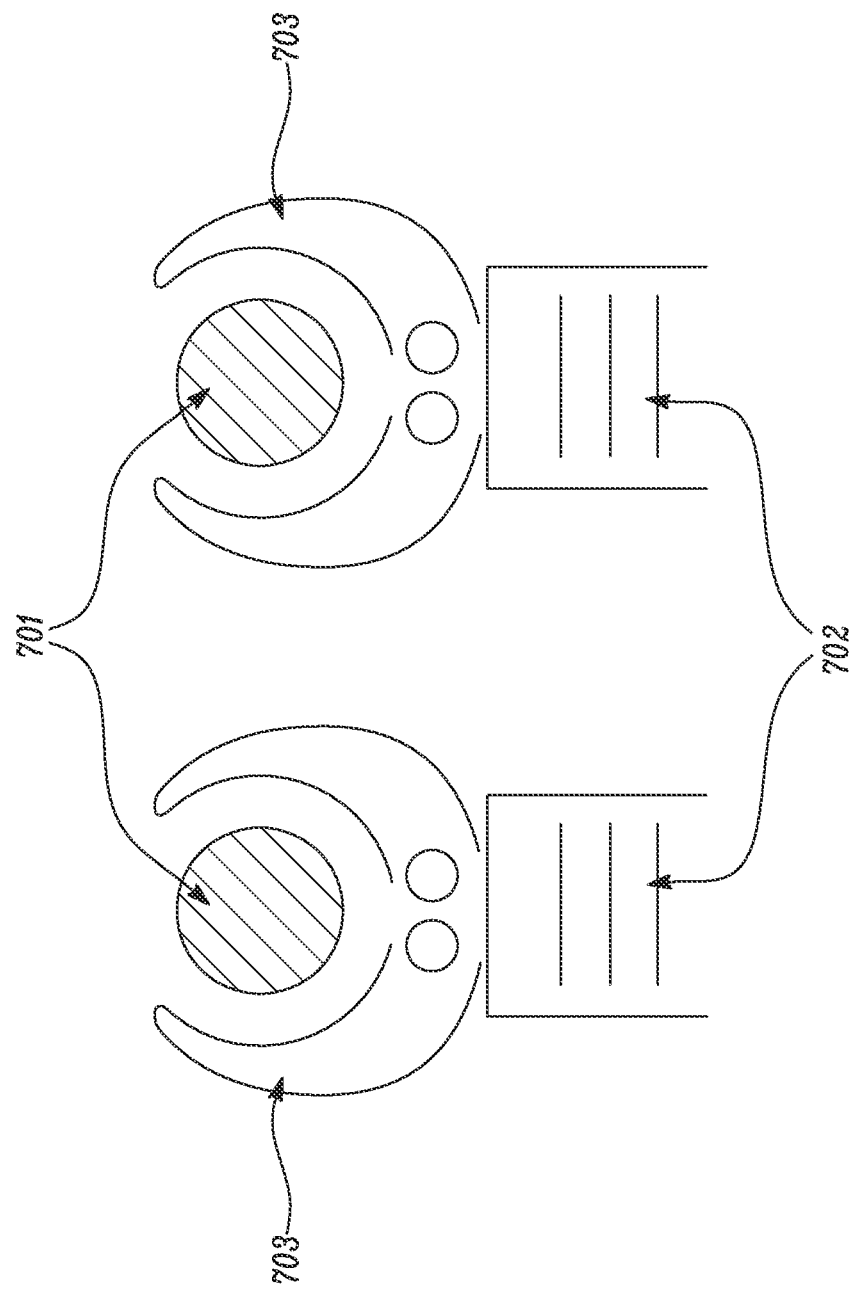

Embodiments will now be described by way of example only, with reference to the Figures, in which:

FIG. 1a presents a prior art example of a cut away of a continuum arm robot;

FIG. 1B presents an example of the joints of a continuum arm robot;

FIG. 2 presents an image of a continuum arm robot system according to the present disclosure;

FIG. 3 presents a schematic of the operation of connected continuum arm robots according to the present disclosure;

FIG. 4 presents an example of a control system used to control the at least two arm continuum arm robotic system of the present disclosure;

FIG. 5 presents a flow chart of the operation of a linked continuum arm robotic system of the present disclosure;

FIG. 6 presents an example of a three continuum robot system according to the present disclosure;

and FIG. 7 presents an example of the clamping mechanism between the second and first continuum arm robots as presented in FIG. 6.

DETAILED DISCLOSURE

Aspects and embodiments of the present disclosure will now be discussed with reference to the accompanying figures. Further aspects and embodiments will be apparent to those skilled in the art.

FIG. 1a presents a prior art example of a cut away of a continuum arm robot. The prior art continuum arm robot comprises the continuum arm robot portion 101 permanently integrated and extending out from the actuator pack 102. The actuator pack 102 contains a plurality of independent actuators 103. These actuators are used to modulate the tension within the tendons that run through the continuum arm 101. The tendons are associated with joints within the arm; each of these joints is designed to move in response to a tensioning or relaxing of the tendon associated with the joint. This tensioning or relaxing of the tendon therefore causes a contraction or extension of the joint, which allows the continuum arm to bend. The actuator pack is shown being positioned on a rail or support 104, which is positioned close to the component to be inspected. The actuator is also provided with a plurality of power and signal cables 105 that are used to power and address the actuators. The individual signals across the range of actuators provide control of the joints such that the continuum arm 101 can be directed. Not shown in FIG. 1 is that there is also a need for an operator with a computing device that is linked to the actuator to control movement of the continuum arm and to perform the desired task. As the continuum arm is permanently integrated into the actuator pack if a different tool is required it requires the use of a complete continuum arm robot system including the actuator. The computing device that is connected to the prior art actuator may be any suitable computing system such as a laptop computer featuring the requisite operating software for the robot and a control input such as a joystick, which allows the continuum arm to be controlled.

FIG. 1B shows an example of the joints of a continuum arm robot. The arm comprises multiple joints, which require at least 2 cables per joint. For example, a system having three joints, each having 4 tendons per joint will require 12 actuators to drive. To increase the number of joints either the number of actuators needs to be increased or the number of tendons per joint needs to be reduced. Highlighted joints 106, 107, 108 are able to be manipulated to move in three dimensions. The joints are configured so that joints 106 and 108 are able to be able to flex in the same plane relative to the centre of the arm, whilst the plane that joint 107 is able to move in is offset by 90° to joints 106 and 108. It is through this repeating configuration of alternating joint angles, each of which results in the movement in different orthogonal plane, that allows the arm to be manipulated in three dimensions. Each joint within the arm has a limit to the amount they are able to flex; this is defined by the design of the arm and the materials that are used. The limit of flex in each joint sets characteristics such as the minimum bending radius and the requirements for the torque that is required to cause a resultant change within the joint. It is the presence of the space in the joints that allows the joint to move and the ease of movement of the joint that results in a low stiffness of the arms in comparison to other robotic arms of the same length. This is because the structural behaviour of a snake-like robotic manipulator can be compared to a cantilever beam under load; this is because the system is fixed on one end to the base with actuation pack and the remainder of the arm is used to navigate through the environment without other points of contact. In this condition, every load applied on the body and/or the tip of the snake-like robot, including its own weight, imposes a significant deflection from the ideal position. At the end of the arm there is positioned a tool or probe that is designed to perform one or more functions once the continuum arm is in position. The heads of the continuum arm robots are often provided with optical systems so that the operator is able to view the head as it is being inserted into the component and to be control the head as it performs its tasks. The optical system is also frequently coupled to an illumination system. The control cables for the tool, electrical power connectors to the illuminations system and optical cables usually are able to run through the centre of the joints within the continuum arm. This has the benefit of protecting the cables form any potential damage. All of these components as well as the arm structure are permanently coupled to the actuator; this means that if the arm fails or has a problem the entire continuum arm robot needs to be replaced.

FIG. 2 presents an image of a continuum arm robot system according to the present disclosure. The continuum arm robots can be the same size. Alternatively, the continuum arm robots can have different lengths and/or thicknesses. The continuum arm robot system features first 201 and second 202 continuum arm robots. Although described as continuum arm robots one of the arms could be a compliant partially robotic arm robot. These continuum arm robots are controlled by their own respective actuator packs, which are linked to a single computer and program. The first continuum arm robot is affixed with an actuator pack for performing the desired task to be performed by the robot system. The second continuum arm robot features a connection mechanism 203 at a point along the continuum arm robot section—in FIG. 2 this is shown at the end of the arm. This connection mechanism is configured to grip the first continuum arm robot at a suitable place to support the first continuum arm robot whilst it performs its desired task. This second continuum arm robot thus is moveable into a suitable position for supporting the first continuum arm robot and allows the system to compensate the load across the multiple channels. As such, the continuum arm robot system does not suffer from such a great deflection as would be the case in a single continuum arm robotic system. By using two continuum arm robots that are coupled so as to brace each other allows for improved static and dynamic behaviour of the system. As both continuum arm robots are movable the operator can move the position of the grip of the first continuum arm robot to any suitable position to carry out its task. For example, this could be close to the tip of the first continuum arm robot or a number of joint sections away from the tip. The presence of a second robotic arm can benefit the system further as it allows for additional tools to be brought into the area as these tools could not be brought in through the channel with a single snake arm robot. The feeds for the tools can be brought through the core of the joint section of the continuum arm robots, so that by utilising this system it is possible to deliver multiple feeds such as air or different gases to a desired area within one operation. Similarly, the use of multiple continuum arm robots within the system can allow for the presence of additional sensors that would not be present with the use of a single arm robot. The length of the robot can be any suitable length. In an embodiment the connecting the two continuum arm robots occurs after the first 6 DoF from the end; this leads to an optimal performance increase.

The head of the continuum arm robots may be provided with sensors such as ultrasonic, cameras, depth sensors. Alternatively, they may be provided with mechanical tools such as grinding or milling tools, or electrical tools such as lasers, or cutting equipment using gas. By utilising multiple continuum arm robots, it is possible to move some of the sensors on the "holding" second continuum arm robot, whilst having a free end-effector on the first continuum arm robot which is dedicated to the operation. This potentially allows more operations or enabling a reduction in external diameter in both robots. Depending on how the robots connect, the connecting robots could be also used to supply pressurized air/liquid, gas, electricity to the tool at the end of the continuum arms. The purpose of the use of the linked continuum arm robots is to increase stiffness and/or payload thanks to the interconnection. Additional advantages of linking the continuum arms include the possibility of "driving/dragging" a main continuum arm with others to enhance its motion range/accuracy and delivering more tools than a single robot through a single access passage would allow.

FIG. 3 presents a schematic of the operation of connected continuum arm robots. In this a first continuum robot 301 is inserted through access passage 305. Once the first continuum arm robot is positioned, or simultaneously with the insertion, the second continuum arm robot 302 can be fed through a second access passage 306 so that both continuum arm robots are within the same working space 307. The second continuum arm robot is directed to the first continuum arm robot, where it is able to clamp or connect to the first continuum arm robot with a connection mechanism 303. With the first and second continuum arm robots coupled the actuator head of the first continuum arm robot is then able to use its tool or gripper such that it can work on the target object 304. In addition to the typical continuum robot tasks, the use of collaboration enhances particular machining and manipulation tasks. In addition, collaboration can be used for inspection tasks that require force interaction with the environment (e.g. ultrasonic inspection). The linking of the first and second continuum arm robots means that whilst working on the target object the first continuum arm robot is supported and as such undergoes less deformation than it would do if it were operating on its own. When the first and second continuum arm robots are to be removed the clamping between the robots is disengaged. This allows the first and second continuum robots to be removed along their respective entrance passages. The image shows the use of two access ports these could for example be borescope holes within a gas turbine engine or other complex system. However, the robotic arms can be used in any suitable entry port into the system. It is also not required that the two robotic arms use different entry paths, they could be inserted into the system adjacent to each other. The use of linked continuum arm robots means that the access to the working area can be less than 50 mm—the only size requirement is that it only needs to be large enough for the continuum arm to fit through. This means that linked continuum robots can be used in areas where it is not possible to access with larger industrial robots. As such, the system can be used in the technology fields of aerospace, nuclear power, oil and gas as well as communications—all of which have issues relating to access for robots and human engineers. As the skilled person would appreciate this is a non-inclusive list and the technology can be extended to be used in any suitable location.

In order to navigate the second continuum arm robot to the first continuum arm robot a camera system may be employed in the first and/or second continuum arm robot so that the operator can direct the head of the second continuum arm robot towards the first continuum arm robot. Alternatively or additionally, positioning sensors can be employed in both continuum arm robots that provides relative positional information back to the operator so that they can manipulate the robots relative to each other so that they can establish a suitable coupling. Suitable sensors may be cameras or depth sensors for navigation and can be used individually or combined. Magnetic sensors could also be incorporated. Additionally or alternatively an optical fibre can be used for shape sensing. This could be done by linking the sensors in each of the first and second continuum arm robots so that they can provide the operator with accurate positional data regarding their location. Relative position control can be used when the two robot arms are approaching each other. The two robot arms are both able before coupling to move independently to one another, however, once linked, they are controlled as a single system. Once connected the control of the robotic system is performed through synchronized/coordinated control. The independent motion is due to them having their own actuators. This allows for accurate positioning of the second continuum arm robot, which is required because the coupling point between the first and second continuum arm robots determines the rigidity of the system. Furthermore, it can be used to control the level of movement that is available to the head of the first continuum arm robot. The control of movement is achieved by connecting the second continuum arm robot closer to the end of the first continuum arm robot, which limits the movement between the connection and the end. As such, if the operator connects the second robot close to the head of the first continuum arm robot it reduces the number of degrees of freedom of motion available to the first continuum arm robot, but it also reduces the flex in the system. This means that the positional control over the head is greater, and thus allowing either heavier objects to be moved or for use in processes were the head produces a reaction force such as during media spraying. As such, the system can work in confined spaces where if the head touches the side of the side of the object that it may cause damage to the object. Alternatively, this process can also be used to lock of degrees of freedom, so that the head can be controlled so that it can only be moved in a single plane—akin to a painter holding his wrist to produce a straight line. However, by connecting to the first continuum arm away from the head increases the flexibility and also the number of degrees of freedom available. As such, this can provide a more controlled continuum arm robotic system to work in areas that need greater dexterity. As discussed, the arms are able to connect "hold hands" so as to increase the support for the arm for performing the task. This allows the same sized continuum arm robot to perform heavier and stronger tasks than it would be able to without it. Having such a system may enable support for the head whilst performing tasks in which a force is exerted against the head of the arm carrying out the task such as spraying. In such a case the presence of the secondary arm acts as a brace. The use of such a system could prevent damage to the surrounding area from the robot head whilst performing such tasks.

In the example as presented in FIG. 3 the connection occurs at the head of the second continuum arm robot; however, the connection may occur at any suitable point along the length of the second and first continuum arms. The connection point may be determined prior to inserting the devices. Alternatively, the operator can determine the coupling point whilst positioning the continuum arm robots within the workspace. This allows the linked continuum arm robots to have separate functioning heads, which because of the linked arms has increased rigidity. The connection at points along the arm may for example be performed by having an electromagnetic clamp at a point along the continuum arm robot. This would allow for example for one head to be able to reform a repair task such as spraying whilst the second head could provide illumination and a camera system. Alternatively, the two heads could provide complimentary functions such as cleaning and repair. The presence of the two continuum arms within the system also increases the supply into the work area as fluids can be piped along the centre of the arms or along the periphery. Similarly, it is also possible to supply optical systems such as illumination and camera systems to the work area. Thus by connecting further down the arms from the head allows for independent control of the two heads of the within the linked system; as such they retain full functionality of the end of the continuum arm from the point at which the two arms are linked. By having two heads that can perform different tasks within the same system increases the functionality of the robot system. It also means that multiple process can be carried out at the same time, which can reduce maintenance time on complex equipment and as such reduce its down time.

The arms of the robots can be connected by a number of different options. The connection system can be made by means of magnetic or adhesive coupling of the continuum arms together. Alternatively or additionally, the connection system can be achieved through mechanical, pneumatic or hydraulic clamping systems. The control of the connection system is linked to a connection control unit on the actuator pack which upon a signal the control computer program starts to initiate the process for connecting the second continuum arm robot to the first. For example, in the case of a hydraulic and pneumatic connection systems the connection control will control the fluid supply to the clamp to close the clamp around the arm of the first continuum arm robot. In an alternate example of using an electromagnetic coupling the connection control unit supplies the electromagnetic clamp with the requisite current to engage the electromagnetic clamp.

A control system is required to control the at least two arm continuum arm robotic system as shown in FIG. 4. The control system features a computer 401 having a processor and memory suitable for running a suitable control program. The computer also has means for a user input, this could be USB port connected to a joystick which the operator moves to control the motion of the robot. Additional functionality of the computer is desirable; this may include a second user input device such as a keyboard or through commands being entered through a touch screen device. Further functionality such as a mouse may also be used. The computer also requires a means of connecting with the actuator packs associated with the different continuum arm robots. This connection can be done through physical linking by the use of a cable or wirelessly.

The first 402 and second 403 continuum arm robot is controlled by a computer program which is used to control the actuator pack of each of the continuum arm robots. This computer program is installed on the computer of the continuum arm system. The computer operates a kinematic model of the motion of a single continuum arm and once linked a coupled continuum arm system in order to control the motion of the continuum arm robots. The computer program may treat one continuum arm as a the master and the other continuum arm robot as the slave. Alternatively, the computer program can treat both arms as a pair. The computer control program needs to accommodate a kinematic model that models for the plurality of manipulators in the system, as well as for the continuum arm robot without the coupling. This is because when the arms are gripped it changes the control and position of the arms. For example, with the first continuum robot gripped by the second continuum robot there will be less associated deflection of a work head when performing the associated task. Therefore, the modelling of the movement by the program needs to accommodate this change in the stiffness of the robotic system. In order to improve the control of the continuum arms when performing their desired tasks and so that an accurate camera system and/or positional sensors may be employed so that the computer program and the operator are fed with accurate in time information on the position of the at least first and second continuum arm robots. The output from the computer program is used to control the actuators connected to the tendons that control each of the robot arms. The computer program can also control the signal that is provided to the connection system. The computer program may be able to take a signal from sensors that may be placed on the arms to determine the movement and motion of the connection system. The computer program may also receive a signal from the connection system to ensure that there is enough pressure on the connection system and thus provide information to the operator that the connection is engaged correctly. Additionally and/or alternatively the robot system may be provided with a connection interlock such that if the signal from the connection is lost then the system is paused along with the task until the connection signal is regained. The computer program is coupled to the user inputs, so that the operator can control the continuum arm robots. The program may, if present, be linked to an imaging device in the one or more continuum arm robots, for example this may involve one or more of the arms having a fibre optic camera with its output fed into a decoder whose signal is fed into the computer and into the program so that the operator can have a live time view of the operation of the continuum arm robots in situ and from this they are able to steer the robot into position. The computer program also has an input to allow the connection system to be operated when desired. The computer program is able to operate each continuum robot individually. It may also be able to operate the two or more continuum robots simultaneously. The output from the computer program is then transmitted to the actuator in order to control the output of the continuum robot.

The actuator pack associated with the first continuum arm robot 404 and the actuator pack of the second continuum arm robot 405 features an input which is able to link to the computer, this may be the presence of a cable jack for the insertion of a networking cable or the presence of a wireless transmission card, or both. These are coupled to a processor within the actuator pack. The processor is coupled to an encoder which is used to control the movement of the actuators. The actuators within the actuator bank of the actuator pack may be paired. The actuators must be capable of producing accurate controlled movement and sufficient torque to move the tendon so as to move the joints within the continuum arm. The actuators can be brushless servo motors. Such servo motors provide the benefit of being lightweight, whilst still producing the torques and the accuracy of movement control that is required for accurate positioning of a continuum arm robot. Alternatively, they can be any other suitable actuator that would be apparent to the person skilled in the art. The actuators may be mounted to a frame allowing the actuators to be connected into a bank which when combined with other paired actuators in frames can be linked to form the actuator pack. Drive electronics of the actuators are coupled to the actuators to control their movement. The actuator pairs may also be provided with a load cell, which is able to measure the load on the actuator and provide a signal of the relative load back to the servo drive which are used to controls the individual actuator. Thus, accurate control of the actuator can be obtained. The movement actuators sets the tension within the within the tendon in the arm. Controlling the tension results in movement of the respective joint within the arm which causes a deflection of the arm position from being straight. Through this it is possible to manipulate the robot and the head into the appropriate position. The second continuum arm robot and its actuator differ from that of the first continuum arm actuator as the second continuum arm robot also features the connection controller mechanism for allowing the second continuum arm robot to connect with the first continuum arm robot. The continuum arm robots may further feature positioning sensors so that the distance and position relative to each other can be determined by the operator so that they can appropriately navigate the two snakes together. These sensors provide signals back to the actuator which relays them to the computer program controlling the actuators. It is important that the controls of both the actuators and the controlling computer program are synchronized to a common clock to allow for coordinated motion between the continuum arm robots. Although the example has been described for cable operated continuum arm robots, it is also possible to use non cable driven systems such as pneumatic, hydraulic, with electric motor controlled continuum arm robots.

When the arms are locked the operator can control the continuum arm robot that is carrying out the task at the time. If the second robotic arm connects at the head then the second continuum arm requires no or minimal control until the two robots are disengaged. However, if the second continuum arm has a functional tool at the end then the second continuum arm robot can be controlled either simultaneously of separately to the control of the first continuum arm robot. Once the task has been performed the command to disengage the connection system can be provided by the operator to disengage the two robots. The two continuum arm robots can then be controlled separately so that they can be removed from the operating space without damaging themselves or any equipment within the workspace.

FIG. 5 presents a flow chart of operation of the linked continuum arm robots. In Step 1 the plurality of separate continuum arm robots enter the workspace through one or more access areas. The access area may be an access port such as a borescope in a gas turbine engine, or another limited space access area. The two or more continuum arm robots can be inserted individually or simultaneously. Once the robots enter the work are the operator(s) will direct them towards the work target. This direction will get the two or more snake arm robots to be within the same proximity in the workspace. Step 2, the two or more continuum arm robots connect with each other. The two or more continuum arm robots are moved with predefined configurations to cover the last distance between them. They are controlled through relative positioning between the arms through the use of proximity and positioning sensors and/or optical systems to allow the operator to view the situation. Once the continuum arm robots are in position the operator can engage the connection system so that the continuum arms connect mechanically to each other. The connection system may be provided with sensors such as pressure sensors so that the operator can be sure that there is a complete connection between the two or more continuum arm robots, so that the operator knows that they can proceed with the required task. This system may be linked to an interlock system such that if it is determined that the first continuum arm robot is no longer gripped then it will stop the movement of the first continuum arm robot until sufficient connection is re-established. Step 3 is performing of the desired task(s). In this the first and possibly other continuum arm robots are moved into position within the workspace so that they correctly positioned to do carry out the desired task. With the continuum arms in position they can be operated to perform the required task, such as debris removal or a repair task. If more than one continuum robot is used in this it may be required that the first continuum robot arm is positioned first and then its task performed and then it can be removed before the second continuum arm robot is then moved into position to perform its associated task. Alternatively, if the systems are complementary both may be moved into position before the task is performed. Once this task is performed the plurality of continuum arms will be move to the desired safe position. Once they are in the desired safe position then step 4 can be performed, which is the disengagement of the at least first and second continuum arm robots. If more than two continuum arm robots are used there may be a desired sequence to disengaging the continuum arm robots so that maximum support is still provided to the first continuum arm robot. The disengaging of the continuum arm robots involves releasing the connection system and may further include moving the continuum arm robot to a safe distance from the first continuum arm robot. Once the continuum arm robots have been disengaged the operator may reposition them within the work area, so that they can be used on a different section of the component if required. If this is the case the process would repeat as above. Step 6 is the removal of the at least first and second continuum arm robots from the access ports. This may be done one continuum arm robot at a time or may be done simultaneously.

FIG. 6 presents an example of a three continuum robot system. In this the first continuum arm robot 601 extends from its actuator pack, which is positioned on the outside of the workspace, to the tip 604 which is required to perform the requisite task of the robot system. A second continuum arm robot 602 extends from a different access port, again with the actuator pack being placed outside of the workspace and the continuum arm robot extending into the workspace with at its tip the second continuum arm robot having a shaped two piece pincer clamp 605 that is used to engage around the body of the first continuum robot and clamp it in position. A third continuum arm robot 603 is also present in this example. The presence of a third continuum robot provides extra support for the first continuum arm robot, which will enable the first continuum arm robot to support a greater load than it could do on its own or with just the second continuum arm robot alone. Like the first and second continuum arm robots the actuator pack of the third continuum arm robot is located outside of the workspace. The third continuum arm robot extends is shown to extend to the first continuum arm robot where it clamps/grips it using an electromagnetic clamping mechanism 606, which engages with a magnetic section of the first continuum arm robot 607. The tip of the first continuum arm robot is thus free to perform the requisite work task within the workspace. An alternative for a three robot system would be that the first and third continuum arm robots have functional heads that can be used for a purpose, whilst the second continuum arm robot features two clamps so that it can engage with the first and third continuum arm robots. Thus, the second continuum arm robot acts as a brace for the first and third continuum arm robots.

FIG. 7 presents an example of the clamping mechanism between the second and first continuum arm robots as presented in FIG. 6. The clamping mechanism 703 is positioned at the end of the second continuum arm robot 702. As the second continuum arm robot is moved closer to the first continuum arm robot 701 the operator ensures that the connection system is in the open position; this is to ensure that the connection system can be positioned with respect to the first continuum arm robot without damaging the first continuum arm robot. It also means that it is already in a position to connect the first continuum arm robot. Once the connection system is positioned around the first continuum arm robot the operator can initiate a signal to close the connection system so that the first continuum arm robot is held by the second continuum arm robot. Sensors, such as pressure sensors may be applied to the connection system to inform the operator that there is contact at a or multiple points of the connection system and that the connection system can safely be closed. To release the operator issues a command to open the connection system, so that the second continuum arm robot releases the first continuum arm robot. The behaviour of connection system can be rigid. In this case it is possible to achieve a connection with high stiffness. Alternatively, the connection system can be compliant, such that it has a lower stiffness, but with higher flexibility and exhibits elastic behaviour. Furthermore, the connection can constrain less than six degrees of freedom, allowing one or more relative motion modes between the robots. In this case, the connection would be equivalent to a revolute, universal, spherical, prismatic or other joint instead of behaving as a fixture. As discussed above one of the continuum arm robots may be a compliant partially robotic arm rather than a compliant robot. In this case, it will still be associated with its own actuator pack and will operate in the same way as if it were a continuum arm system apart from having less control over the positioning and the motion of itself.

Although, in the above described examples the system is shown having two linked continuum arms, it is possible to have three or higher number of continuum arms linked together in the system. By increasing the number of arms within the system allows the system to have a greater degree of functionality.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A continuum arm robot system, comprising:
   at least a first continuum arm robot and a second continuum arm robot, each continuum arm robot being controlled by its own actuator pack, wherein:
   at least the first continuum arm robot has a head that is configured to be provided with a tool;
   at least the second continuum arm robot comprises a releasable connection mechanism to engage in gripping the first continuum arm robot in a workspace, so as to link the at least two continuum arm robots into a single redundant robotic system with at least the second continuum arm robot providing support for the first continuum arm robot,
   ends of the first continuum arm robot and the second continuum arm robot have different structures; and
   a processor that is configured to control the first continuum arm robot and the second continuum arm robot such that the second continuum arm robot releasably and directly engages the first continuum arm robot at a distance from the head of the first continuum arm robot, wherein each actuator pack is coupled to the processor that is a single control processor.

2. The continuum arm robot system according to claim 1, wherein the connection mechanism is positioned at the end of the second continuum arm robot.

3. The continuum arm robot system according to claim 1, wherein the connection mechanism is positioned along a continuum arm section and an end of the continuum arm section features a functional head.

4. The continuum arm robot system according to claim 3, wherein the second continuum arm robot features a functional tool at its tip.

5. The continuum arm robot system according to claim 1, wherein the connection mechanism is one of a hydraulic gripper, a pneumatic gripper, a mechanical gripper or an electromagnetic gripper.

6. The continuum arm robot system according to claim 5, wherein the connection mechanism is the electromagnetic gripper.

7. The continuum arm robot system according to claim 1, wherein each continuum arm robot comprises a plurality of sensors.

8. The continuum arm robot system according to claim 7, wherein some of the sensors are provided to determine the distance and relative position between the first and second continuum arm robots.

9. The continuum arm robot system according to claim 1, wherein a clamp features an interlock, which prevents movement of the robot system if the interlock is activated.

10. The continuum arm robot system according to claim 1, wherein one of the continuum arm robots is equipped with a camera system and/or an illumination system.

11. The continuum arm robot system according to claim 1, wherein the connection mechanism is rigid.

12. The continuum arm robot system according to claim 1, wherein the connection mechanism is compliant.

13. The continuum arm robot system according to claim 1, wherein the connection mechanism constrains the single redundant robotic system to less than six degrees of freedom.

14. A method of operating the continuum arm robot system according to claim 1, the method comprising:
   inserting the first continuum arm robot and inserting the second continuum arm robot into the workspace;
   connecting the first and second continuum arm robots to link the first and second continuum arm robots to form the single redundant robotic system, the second continuum arm robot releasably and directly engaging the first continuum arm robot at the distance from the head of the first continuum arm robot;
   performing a desired task using at least the first continuum arm robot;
   disconnecting the first and second continuum arm robots; and
   extracting the first and second continuum arm robots from the workspace.

15. The method according to claim 14, wherein the first and second continuum arm robots are moved onto predefined configurations and are controlled through relative positioning and approach each other to connect the first and second continuum arm robots.

\* \* \* \* \*